United States Patent
Yang et al.

(10) Patent No.: US 9,112,225 B2
(45) Date of Patent: Aug. 18, 2015

(54) PRECURSOR FORMULATION FOR BATTERY ACTIVE MATERIALS SYNTHESIS

(75) Inventors: Lu Yang, Fremont, CA (US); Miaojun Wang, San Jose, CA (US); Dongli Zeng, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 29 days.

(21) Appl. No.: 13/470,041

(22) Filed: May 11, 2012

(65) Prior Publication Data

US 2012/0288617 A1 Nov. 15, 2012

Related U.S. Application Data

(60) Provisional application No. 61/485,500, filed on May 12, 2011.

(51) Int. Cl.
| | |
|---|---|
| *H01M 4/60* | (2006.01) |
| *H01M 4/04* | (2006.01) |
| *H01M 4/48* | (2010.01) |
| *C01B 13/18* | (2006.01) |
| *H01M 10/052* | (2010.01) |

(52) U.S. Cl.
CPC ............ *H01M 4/48* (2013.01); *C01B 13/185* (2013.01); *H01M 10/052* (2013.01)

(58) Field of Classification Search
CPC ........ H01M 4/48; H01M 10/052; H01B 1/08; C01B 13/14; C01B 13/185; Y02E 60/12; Y02E 60/122
USPC ............... 252/182.1, 183.11, 183.13, 183.14, 252/519.1; 429/218.1, 220, 231.5; 427/58
See application file for complete search history.

(56) References Cited

U.S. PATENT DOCUMENTS

| | | | | |
|---|---|---|---|---|
| 2,624,663 | A * | 1/1953 | Centanni | 504/101 |
| 2,731,463 | A * | 1/1956 | Bachmann et al. | 544/215 |
| 5,162,428 | A * | 11/1992 | Katoh et al. | 524/594 |
| 6,274,273 | B1 * | 8/2001 | Cho et al. | 429/231.95 |
| 7,700,152 | B2 | 4/2010 | Laine et al. | |
| 7,842,200 | B2 | 11/2010 | Ehrman et al. | |
| 2002/0031701 | A1 * | 3/2002 | Kawakami et al. | 429/137 |
| 2004/0072444 | A1 * | 4/2004 | Park et al. | 438/710 |
| 2004/0120882 | A1 * | 6/2004 | Kumar et al. | 423/599 |
| 2005/0131163 | A1 | 6/2005 | Rhine et al. | |
| 2007/0035055 | A1 | 2/2007 | Gee et al. | |

(Continued)

OTHER PUBLICATIONS

International Search Report and Written Opinion for PCT/US2012/037620 dated Nov. 30, 2012.

(Continued)

*Primary Examiner* — Joseph D Anthony
(74) *Attorney, Agent, or Firm* — Patterson & Sheridan, LLP

(57) ABSTRACT

Compositions and methods of forming battery active materials are provided. A solution of battery active metal cations and reactive anions may be blended with a fuel to yield a precursor mixture usable for synthesizing a battery active material for deposition onto a substrate. The battery active metal cations include lithium, manganese, cobalt, nickel, iron, vanadium, and the like. Reactive anions include nitrate, acetate, citrate, tartrate, maleate, azide, amide, and other lower carboxylates. Suitable fuels, which may be water miscible, may include amino compounds. Alcohols and sugars may be added to adjust carbon content and fuel combustion characteristics. An exothermic reaction is performed to convert the metals into battery active oxides.

17 Claims, 2 Drawing Sheets

(56) References Cited

U.S. PATENT DOCUMENTS

| | | |
|---|---|---|
| 2008/0210910 A1 | 9/2008 | Hsu et al. |
| 2009/0000953 A1* | 1/2009 | Orihashi et al. ............ 205/247 |
| 2010/0154206 A1 | 6/2010 | Mao et al. |
| 2010/0159324 A1 | 6/2010 | Irvin et al. |
| 2011/0200874 A1* | 8/2011 | Ono et al. .................... 429/213 |
| 2012/0137508 A1* | 6/2012 | Oladeji ........................ 29/623.1 |
| 2012/0153772 A1* | 6/2012 | Landa et al. .................. 310/309 |
| 2012/0315568 A1* | 12/2012 | Lee et al. ...................... 429/483 |
| 2013/0108802 A1* | 5/2013 | Oladeji .......................... 427/565 |
| 2013/0108920 A1* | 5/2013 | Oladeji .......................... 429/199 |
| 2013/0196469 A1* | 8/2013 | Facchetti et al. ............. 438/104 |

OTHER PUBLICATIONS

Aruna, et al., "Combustion synthesis and nanomaterials," Current Opinion in Solid State and Meterials Science, 2008, pp. 44-50.

Chakradhar, et al., "Solution combustion derived nanocrystalline macroporous wollastonite ceramics," Materials Chemistry and Physics, vol. 95, Issue 1, Jan. 10, 2006, pp. 169-175.

Fu et al., "Microwave-induced combustion synthesis of $Li_{0.5}Fe_{2.5-x}Mg_xO_4$ powder and their characterization," Journal of Applied Physics, 2009, 3 pages.

Patil, et al., "Current Opinion in Solid State & Materials Science," Combustion Synthesis, vol. 2, Issue 2, Apr. 1997, pp. 158-165.

\* cited by examiner

PRECURSOR FORMULATION FOR BATTERY ACTIVE MATERIALS SYNTHESIS

CROSS-REFERENCE TO RELATED APPLICATIONS

This application claims benefit of U.S. Provisional Patent Application Ser. No. 61/485,500, filed May 12, 2011, which is incorporated herein by reference.

FIELD

Embodiments of the present invention relate generally to lithium-ion batteries, and more specifically, to methods and compositions for fabricating such batteries.

BACKGROUND

Fast-charging, high-capacity energy storage devices, such as supercapacitors and lithium (Li) ion batteries, are used in a growing number of applications, including portable electronics, medical devices, transportation, grid-connected large energy storage, renewable energy storage, and uninterruptible power supplies (UPS). In modern rechargeable energy storage devices, the current collector is made of an electric conductor. Examples of materials for the positive current collector (the cathode) include aluminum, stainless steel, and nickel. Examples of materials for the negative current collector (the anode) include copper (Cu), stainless steel, and nickel (Ni). Such collectors can be in the form of a foil, a film, or a thin plate, having a thickness that generally ranges from about 6 to 50 μm.

The active electrode material in the positive electrode of a Li-ion battery is typically selected from lithium transition metal oxides, such as $LiMn_2O_4$, $LiCoO_2$, $LiNiO_2$, or combinations of Ni, Li, Mn, and Co oxides, and includes electroconductive particles, such as carbon or graphite, and binder material. Such positive electrode material is considered to be a lithium-intercalation compound, in which the quantity of conductive material is typically in the range from 0.1% to 15% by weight.

Graphite is usually used as the active electrode material of the negative electrode and can be in the form of a lithium-intercalation meso-carbon micro beads (MCMB) powder made up of MCMBs having a diameter of approximately 10 μm. The lithium-intercalation MCMB powder is dispersed in a polymeric binder matrix. The polymers for the binder matrix are made of thermoplastic polymers including polymers with rubber elasticity. The polymeric binder serves to bind together the MCMB material powders to manage crack formation and disintegration of the MCMB powder on the surface of the current collector. The quantity of polymeric binder is typically in the range of 0.5% to 30% by weight.

The separator of Li-ion batteries is typically made from microporous polyolefin polymer, such as polyethylene foam, and is applied in a separate manufacturing step.

As Li-ion batteries become more important for power applications, cost-effective, high-volume manufacturing methods are needed. The electrodes of Li-ion batteries are commonly made using a sol gel process in which a paste of battery active material is applied to a substrate as a thin film and then dried to produce a final component. CVD and PVD processes are also conventionally used to form battery active layers for thin film batteries. Such processes have limited throughput, however, and are not cost-effective for high volume manufacturing.

Accordingly, there is a need in the art for cost-effective, high volume methods for making Li-ion batteries, and new materials suitable for such methods.

SUMMARY

Compositions and methods of forming battery active layers on a substrate are provided. A solution of battery active metal cations and reactive anions is mixed with additives to yield a precursor mixture usable for synthesizing a battery active material for deposition onto a substrate. The solution may comprise solvents such as water or organic ion solvents such as methanol and ethanol. The battery active metal cations include lithium, manganese, cobalt, nickel, iron, vanadium, and the like. Reactive anions include nitrate, acetate, citrate, tartrate, maleate, azide, amide, and other lower carboxylates. Suitable additives, which may be water miscible, may include amino compounds. Alcohols and sugars may be added to adjust carbon content and solution combustion characteristics. An exothermic reaction, or other heating process, may be performed to convert the metals into battery active oxides.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
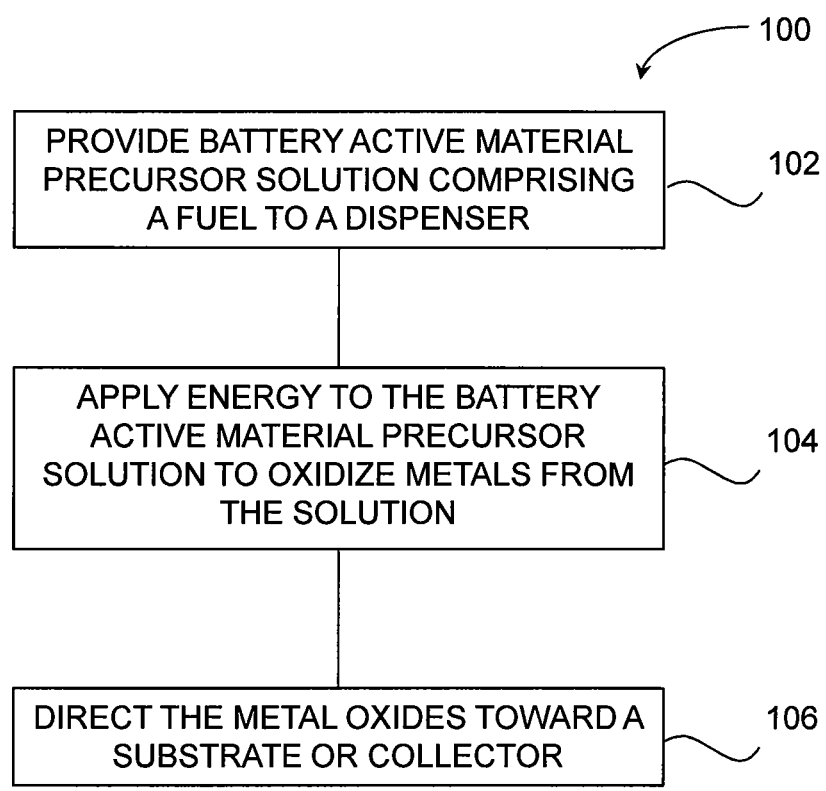
FIG. 1 is a flow diagram summarizing a method according to one embodiment.

Precursor formulations for synthesis of battery active materials include ions needed for active materials synthesis along with additives. FIG. 1 is a flow diagram summarizing a method 100 for forming a battery active layer on a substrate, or synthesizing and collecting a battery active material, according to one embodiment. At 102, a battery precursor solution comprising additives is provided to a dispenser. The battery precursor solution is generally a metal salt solution of metal ions to be converted into a battery active material. The solvent may be water or an organic ion solvent such as methanol or ethanol, or a mixture of ion solvents. One or more of the additives may be water miscible, and may be a carbon containing species or an organic material that promotes, for example by combustion, synthesis of the battery active materials from the dissolved metal ions. One or more additives may also facilitate formation of high quality active materials by forming complexes with the ions.

In one aspect, the metal salt solution is formed from anions that may be reactive when properly energized. Examples of such anions are lower carboxylates, such as acetate, citrate, tartrate, maleate, nitrate, azide, and amide. Nitrate solution of battery active metals may be conveniently used in a thermal synthesis reaction. An aqueous or alcoholic solution of one or more metal nitrate salts may be exposed to the energy released by an exothermic reaction, or to heat from any heat source such as resistive electric heating or plasma discharge. When properly energized, the solvent evaporates, and may decompose or combust, the salts decompose, and the species generated react with oxygen. The metal ions react with oxygen to form battery active crystals. The other oxygen reactions give off energy to drive the conversion of metal ions to metal-oxygen crystals. If a carbon containing species participates in the reaction, for example if the energy is provided by an oxygen-deficient combustion reaction, the metal-oxygen crystals may be covered by a coating of amorphous carbon particles.

The metal-oxygen crystals are a complex matrix of different metal ions with oxygen atoms. The proportion of metal ions generally follows the proportion of the various metal ions in the battery active material precursor solution. The proportion of oxygen in the crystals is that which generally satisfies the valence shells of the various ions, and depends on the exact proportion of ions of varying valence in the matrix. If nickel ions are used for the battery active material, the nickel ions typically participate in the battery active crystal matrix with valence of +2. Cobalt ions typically have valence of +3, and manganese +4. Lithium ions generally have valence of +1. Valence state of ions and atoms in a battery active material may vary, however. For example, in a material such as $LiNi_{0.5}Mn_{0.3}Co_{0.2}O_2$, some of the nickel atoms or ions may have valence state +3. During charging, lithium ions move out of the cathode material into the anode through an electrolyte disposed in a separator material, and any nickel or cobalt ions increase in valence to restore electrochemical balance.

In one embodiment, a standard molar solution of metal nitrates may be prepared from any desired battery active metal, such as lithium, manganese, cobalt, nickel, iron, vanadium, and the like. Standard molar solutions of different metals may then be mixed into an aqueous precursor according to any desired recipe. The mix ratios of the various metal solutions will define the metal composition of the battery active material synthesized, and therefore its properties. A 1M solution of lithium nitrate may be mixed with a 1M solution of manganese nitrate, a 1M solution of nickel nitrate, a 1M solution of cobalt nitrate, etc., in desired ratios to form a precursor mixture having a specific composition of metals. When converted to a battery active material, the battery active material will have substantially the same ratios of metal ions. The composition of the synthesized battery active material may thus be controlled by controlling the blend ratios of the various standard molar solutions. In a lithium, nickel, manganese, cobalt system, lithium is typically provided in excess to the sum of nickel, manganese, and cobalt, for example up to about 10% stoichiometric excess. In some embodiments, the standard molar solution of lithium nitrate referred to above may be a 3M solution In general, adjusting the composition of the cathode material entails balancing the properties of charge/discharge capacity, voltage, and stability, which are influenced, in turn, by composition, density, and porosity. Ions such as manganese contribute to stability of the matrix but not capacity, while ions such as nickel contribute to capacity and voltage, but may detract from stability if present in high concentrations. Cobalt contributes in part to both properties, but is expensive and may be toxic.

The standard molar solution may be mixed with a carbon containing material miscible with the solution. The carbon containing material, which may be a fuel, may also be a nitrogen containing material. Classes of compounds useful in this regard include amino compounds, hydrazides, hydrazones, azides, azines, azoles, and combinations thereof. Miscible organic compounds, such as alcohols, ketones, carboxylic acids, and aldehydes, may also be included in the precursor mixture. Sugars or polymers may be added to the mixture for extra carbon content, and to adjust density and viscosity of the mixture, if desired, to control fluid properties for a reactive spray deposition process.

At 104, energy is applied to the battery active material solution to evaporate or decompose the solvent, decompose the salts, and react metal ions in the solution with oxygen to form particles of battery active material. In general, energy is applied at a rate sufficient to combust the miscible fuels and carbon species in the precursor mixture, which in turn provide energy for the reaction. While a combustion reaction may be used to generate energy for the reaction, other sources of energy, such as electromagnetic radiation, for example microwaves, may also be used. The reactions yield a powder of battery active material that is deposited on a substrate or collected at 106. Miscible organics may also serve as a fuel and/or a reaction control agent that complexes with ions in the solution to modify the resulting crystal structure and morphology. Upon combustion the organics may add carbon particles to the battery active material. Amorphous carbon particles, resulting in part from excess carbon in the combustion reactions, may improve conductivity of the deposited/synthesized battery active materials.

Mixtures of fuels may be used to adjust the energy input quantity and rate of the combustion reaction. Lower molecular weight organic compounds, such as alcohols, generally combust more slowly and at lower temperature than the amino or nitrogen containing fuels. Adjusting the intensity of combustion may be useful when adjusting latent heat of the precursor solution, for example, or when adjusting atomization performance, if an atomization process is to be performed. Water has relatively high latent heat, and requires substantial energy to evaporate. Using miscible organic compounds to reduce the quantity of water in the mixture may reduce the latent heat of the solution, reducing the energy required to dry the battery active material.

Energy input into the reaction may influence the properties of the active materials by affecting crystal structure, morphology, and density. Within certain temperature ranges, a high temperature, high energy reaction will result in a denser, less porous material. Low porosity provides a large amount of active material to store more energy, but may lead to lower power performance. High porosity results in less active material for energy storage but higher power performance. In most embodiments, the deposited layer will have a bulk density between about 2.5-4.0 g/cc.

Some exemplary nitrogen containing materials that may be used as water miscible fuels are as follows:

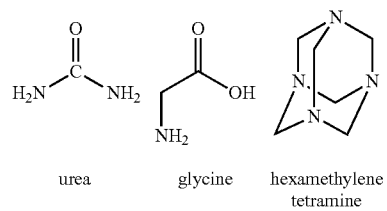

urea      glycine      hexamethylene tetramine

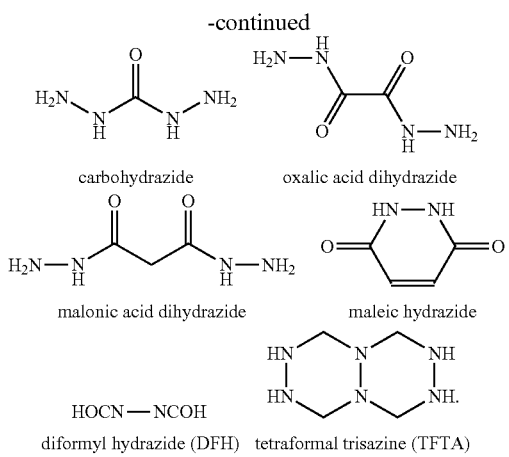

Exemplary water miscible organics that may be used include lower glycols, such as ethylene glycol or propylene glycol, polyvinyl alcohol, and polyacrylic acid.

Water content of the precursor mixture may be adjusted by using different standard molar solutions of metal salts, up to the solubility limit of the salts in water. Solubility limits of the various metal salts in water are reached generally in the molarity range of about 0.1M to about 14M, depending on the salt and the solution temperature. Thus, standard molar solutions having molarity between about 0.1M and about 10M, such as between about 1M and about 6M, may be used to form a precursor blend having precisely specified compositions. Higher concentration salt solutions may have higher density and/or viscosity in some cases, which may affect their performance in a combustion synthesis process, the effect of which may be mitigated by using water miscible organics with lower density or viscosity. Higher density and viscosity organics may be used, in turn, to increase density or viscosity of the blend. Such adjustments may be useful for adjusting an atomization process that may be used in conjunction with a combustion synthesis process. Volume of the blend may also be adjusted by adjusting concentration of the blend components to achieve a desired reaction residence time.

Sugars such as sucrose may also be added to the precursor mixture to adjust density, viscosity, and/or thermochemical properties. Carbon in sugar molecules may also contribute to formation of conductive carbon that co-deposits with the battery active materials.

Fuel content of the mixture is generally between about 0.1% and about 20% by weight, for example between about 0.1% and about 10%, for example about 5% by weight, depending on the fuel blend used. In an exemplary embodiment, a 3M solution of each of lithium nitrate, manganese nitrate, nickel nitrate, and cobalt nitrate is provided to a spray reactor at a volumetric flow rate of about 3:1:1:1. In some embodiments, a slight excess of lithium nitrate may be used, for example a ratio of 3.3:1:1:1, to form lithium rich cathode active materials. Urea is then added to achieve a urea concentration between about 2M and about 4M, for example about 3M. The blend is provided to a spray reactor at a rate of 28 ml/min, the reactor combusting about 12 sLm of a fuel such as propane, acetylene, natural gas, or a mixture thereof, acetylene being preferred, in an oxygen-rich flame. The combustibles in the precursor mixture react, energizing an oxidation reaction of the metals to produce a mixed metal oxide powder at a rate of between about 1 g/min and about 1000 g/min. In alternate embodiments, energy may be applied to the blend by providing the blend to a chamber with an energy input mechanism, such as heated walls or a radiant source, to heat the blend to a target temperature, drive away solvent, and perform the reactions to produce battery active materials.

Components described herein as fuels may have effects besides combustion. Some such compounds may affect the mechanism of crystal formation by coordinating with cations in the precursor solution. Such mechanisms may differentially affect reaction rates of some cations more than others, which may affect the properties of the battery active material. Other compounds may facilitate formation of spherical particles by providing a nucleation site. Some compounds may have further effect as catalysts. A given compound may therefore be a deposition facilitator in any or all of these ways.

In an alternate embodiment, energy may be coupled into the precursor mixture by exposing the mixture to microwaves having frequency of from about 600 MHz to about 10 THz, for example 2.45 GHz, and power level between about 500 W and about 100,000 W. For example, exposing about 5 mL of the blend described above to 2.45 GHz microwave energy at about 500 W for about 2 minutes yields a battery active dry powder. A short exposure to microwave radiation may also be used to nucleate crystal growth for a subsequent crystallization process.

The following exemplary process is expected to yield a suitable battery active material for a lithium ion cathode electrode. A combustible mixture of 37% acetylene in oxygen, by volume, is provided to a flame sprayer at a flow rate of 32.5 sLm and ignited to form a flame jet. A liquid precursor mixture is then provided to the flame sprayer at a total flow rate of 28 ml/min. The liquid precursor is a mixture of 3M solutions of lithium nitrate, manganese nitrate, nickel nitrate, and cobalt nitrate. A solution of 416 ml is prepared by mixing 218 ml of 3M lithium nitrate with 66 ml each of manganese nitrate, nickel nitrate, and cobalt nitrate. One mole of urea is then added to the solution.

The liquid precursor is atomized in the flame sprayer by flowing the precursor through an atomization nozzle to form droplets with sizes ranging from a few hundred nanometers to a few tens of micrometers. Droplets of the liquid precursor are dispersed uniformly. Energy from an acetylene flame, or from other heat sources such as a resistive heater, drives away or decomposes the solvent and oxidizes the metals to form battery active particles. In one category, the particles may have a composition of $Li_xNi_yMn_zCo_wM_vO_{2-u}F_u$, wherein u, v, w, x, y, and z are each between about 0 and 2, wherein M is a metal selected from the group consisting of aluminum, magnesium, zirconium, zinc, chromium, titanium, and iron. In another category, the particles may have a composition of $Li_xM1_yM2_{2-y}O_{4-u}F_u$ wherein x, y, and u are between 0 and 2, and M1 and M2 are each elements independently selected from the group consisting of nickel, manganese, magnesium, iron, cobalt, boron, aluminum, molybdenum, chromium, zinc, germanium, and copper. In a third category, the particles may have a composition of $Li_xM1_yM2_vPO_4$ wherein x, y, and v are between 0 and 1, and M1 and M2 are each metals selected from the group consisting of iron, nickel, manganese, and cobalt.

The battery active particles are co-deposited on a substrate with a binder material that includes a polymer. The polymer is provided as a solution, suspension, or emulsion, for example of styrene-butadiene rubber in water, and sprayed into the hot jet of battery active material. The remaining energy of the jet vaporizes the water, coalescing the polymer around the particles. The polymer-coated particles deposit on the substrate, and the polymer cools and cross-links to immobilize the battery active particles on the substrate. Alternatively, the battery active material may be collected using a solids collector such as a cyclone, and may be stored or transported for later use, such as for deposition on, or application to, a conductive, or partially conductive, substrate.

Battery active materials made using methods and compositions described herein typically have charging capacity between about 170 and 350 mAh/g, for example about 174.4 mAh/g in one case of charging from 2.7 V to 4.3 V. Discharge capacity is between about 150 and 300 mAh/g, for example about 155.0 mAh/g in the above case. Typical coulombic efficiency is more than about 80%, such as more than about 85%. In the above example, the coulombic efficiency is about 88.9%. Specific capacity decline per charging cycle is typically less than about 0.3%. In the example above, specific capacity decline per cycle is about 0.17%.

Figure 2:
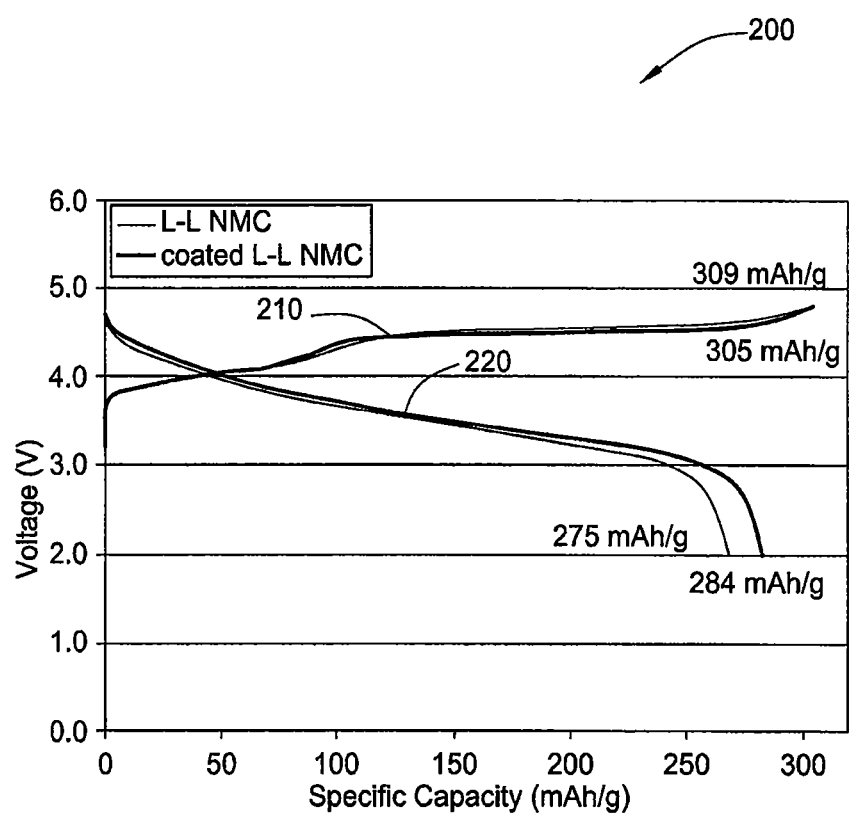
FIG. 2 shows a charge/discharge graph 200 for one exemplary battery active material made according to the methods and compositions described herein.

FIG. 2 shows a charge/discharge graph 200 for one exemplary battery active material made according to the methods and compositions described herein. At 210, the charging curve shows charging to 4.8V at a specific capacity greater than 300 mAh/g. At 220, the discharging curve shows discharging from 4.8V at a specific capacity of about 259 mAh/g.

While the foregoing is directed to embodiments of the invention, other and further embodiments of the invention may be devised without departing from the basic scope thereof.

What is claimed is:

1. A chemical composition, comprising:
    a water miscible solution comprising a first battery active metal cation, a second batter active metal cation, and reactive anions, wherein the first battery active metal cation is lithium; and
    a water miscible organic material selected from the group consisting of hexamethylene tetramine, carbohydrazide, oxalic acid dihydrazide, malonic acid dihydrazide, maleic hydrazide, diformyl hydrazide, tetraformal trisazine, and combinations and derivatives thereof, wherein the water miscible organic material is between about 0.1 weight percent and about 10 weight percent of the chemical composition.

2. The chemical composition of claim 1, wherein the first and second battery active metal cations form battery active metal oxides.

3. The chemical composition of claim 1, wherein the reactive anions comprise one or more anions from the group consisting of nitrate, acetate, citrate, tartrate, azide, amide, and combinations or derivatives thereof.

4. The chemical composition of claim 1, further comprising a fuel.

5. The chemical composition of claim 1, wherein the water miscible solution comprises metal nitrates.

6. The chemical composition of claim 5, wherein the second battery active metal cation is selected from the group consisting of lithium, nickel, cobalt, manganese, and iron.

7. The chemical composition of claim 3, further comprising a water miscible fuel.

8. The chemical composition of claim 3, comprising more than one reactive anion.

9. The chemical composition of claim 4, wherein the fuel is between about 0.1 weight percent and about 5 weight percent of the chemical composition.

10. The chemical composition of claim 1, wherein the water miscible solution is a blend of two or more standard molar solutions.

11. The chemical composition of claim 10, further comprising an alcohol, wherein the water miscible organic material comprises an amino compound.

12. A chemical composition, comprising:
    a water miscible solution comprising a first battery active metal cation, a second battery active metal cation, and reactive anions, wherein the first battery active metal cation is lithium, wherein the second battery active metal cation is selected from the group consisting of nickel, cobalt, and manganese; and
    a water miscible organic material selected from the group consisting of hexamethylene tetramine, carbohydrazide, oxalic acid dihydrazide, malonic acid dihydrazide, maleic hydrazide, diformyl hydrazide, tetraformal trisazine, and combinations and derivatives thereof, wherein the water miscible organic material is between about 0.1 weight percent and about 10 weight percent of the chemical composition.

13. The chemical composition of claim 12, wherein the first and second battery active metal cations form battery active metal oxides.

14. The chemical composition of claim 12, wherein the reactive anions comprise one or more anions selected from the group consisting of nitrate, acetate, citrate, tartrate, azide, amide, and combinations or derivatives thereof.

15. The chemical composition of claim 12, further comprising a fuel.

16. The chemical composition of claim 12, wherein the water miscible solution comprises metal nitrates.

17. The chemical composition of claim 12, further comprising an alcohol, wherein the water miscible organic material comprises an amino compound.

* * * * *

UNITED STATES PATENT AND TRADEMARK OFFICE
CERTIFICATE OF CORRECTION

| | |
|---|---|
| PATENT NO. | : 9,112,225 B2 |
| APPLICATION NO. | : 13/470041 |
| DATED | : August 18, 2015 |
| INVENTOR(S) | : Yang et al. |

It is certified that error appears in the above-identified patent and that said Letters Patent is hereby corrected as shown below:

In the Claims:

Column 7, Claim 1, Line 29, please delete "batter" and insert -- battery -- therefor;

Column 8, Claim 6, Line 5, please delete "lithium,".

Signed and Sealed this
Twenty-second Day of March, 2016

Michelle K. Lee
*Director of the United States Patent and Trademark Office*